United States Patent [19]

Caldwell et al.

[11] 4,368,110
[45] Jan. 11, 1983

[54] SUBSTITUTED COBALT OXIDE SPINELS

[75] Inventors: Donald L. Caldwell; Mark J. Hazelrigg, both of Lake Jackson, Tex.

[73] Assignee: The Dow Chemical Company, Midland, Mich.

[21] Appl. No.: 247,430

[22] Filed: Mar. 25, 1981

[51] Int. Cl.³ .............................................. C25B 11/06
[52] U.S. Cl. ............................ 204/290 F; 204/290 R; 204/291; 427/126.5; 427/126.6; 429/218
[58] Field of Search ............... 204/290 R, 290 R, 291; 252/425.3; 427/126.5, 126.6; 429/218

[56] References Cited

U.S. PATENT DOCUMENTS 4,061,549 12/1977 Hazelrigg et al. .................. 204/98

Primary Examiner—F. Edmundson
Attorney, Agent, or Firm—W. J. Lee

[57] ABSTRACT

Electroconductive substrates are coated with substituted cobalt oxide spinels conforming substantially to the empirical formula $$M_x Z_y Co_{3-(x+y)} O_4$$

where M and Z each represent at least one metal from the Groups IB, IIA, IIB, where x and y each, independently are values greater than zero but less than 1, and where x plus y is not greater than 1. The composites are prepared by thermally oxidizing metal oxide precursors in-situ on the substrate, including, optionally, modifier metal oxide materials as a separate dispersed phase in the contiguous spinel structure. The composites are useful, e.g., as an anode material in an electrolytic cell.

10 Claims, No Drawings

SUBSTITUTED COBALT OXIDE SPINELS

BACKGROUND OF THE INVENTION

Various cobalt oxide spinels coated onto electrically-conductive substrates, especially for use as anodes in brine electrolysis, are known. Of particular relevancy are U.S. Pat. Nos. 3,977,958; 4,061,549; and 4,142,005; all of which are incorporated herein by reference.

Also of various degrees of relevancy are U.S. Pat. Nos. 4,073,873; 3,711,382; 3,711,397; 4,028,215; 4,040,939; 3,706,644; 3,528,857; 3,689,384; 3,773,555; 3,103,484; 3,775,284; 3,773,554; 3,632,498; and 3,663,280.

SUMMARY OF THE INVENTION

An insoluble anode for electrolysis, especially electrolysis of brine solutions, is prepared by coating an electroconductive substrate with an effective amount of a polymetal oxide having a spinel structure conforming substantially to the empirical formula comprising $M_xZ_yCo_{3-(x+y)}O_4$, wheere $0<x<1$, $0<y<1$, $0<(x+y)\leq 1$, and where M and Z each are at least one metal of Groups IB, IIA, and IIB of the Periodic Table. The spinel coating optionally contains a modifier metal oxide. The coating is prepared by applying a fluid mixture of the metal oxide precursors to the substrate and heating under oxidizing conditions at a temperature in a range effective to form the spinel coating in-situ on the substrate. A "polymetal" cobalt spinel is used herein to describe a spinel containing a plurality of metals, of which cobalt is one.

DESCRIPTION OF THE INVENTION

In general, the spinel coating is prepared in-situ on the electroconductive substrate by applying a fluid mixture (preferably a solution) of the spinel-forming precursors along with, optionally, any modifier metal oxide precursors desired, to the substrate, then heating at a temperature and for a time effective to produce the spinel structure as a layer or coating on the substrate.

The temperature effective in producing the spinel structure is generally in the range of about 200° C. to about 475° C., preferably in the range of about 250° C. to about 400° C. At temperatures below about 200° C. the formation of the desired spinel structure is likely to be too slow to be feasible and it is likely that substantially no spinel will be formed, even over extended periods of time. At temperatures above about 475° C. there is likely to be formed other cobalt oxide structures, such as cobaltic oxide ($Co_2O_3$) and/or cobaltous oxide (CoO), whether substituted or not. Any heating of the spinel above about 450° C. should be of short duration, say, not more than about 5 minutes, to avoid altering the desired spinel structures to other forms of the metal oxides and to substantially avoid thermal oxidation of the substrate. Any modifier metal oxides present will be formed quite well at the spinel-forming temperatures.

The length of time at which the heating is done to form the spinel structure is, generally, inversely related to the temperature. At lower temperatures within the prescribed range, the time may be as much as 8 hours or more without destroying the spinel structure or converting substantial amounts of it to other oxide forms. At the upper end of the prescribed heating range, the time of heating should not be extended beyond the time needed to form the desired spinel structure because extended heating times may destroy or convert a substantial amount of the spinel to other oxide forms; at the upper end of the range a heating time in the range of about 1 minute to about 5 minutes is generally satisfactory in forming the spinel without forming other oxide forms.

The substrates of interest in the present invention are electroconductive metals comprising the valve metals or film-forming metals which includes titanium, tantalum, zirconium, molybdenum, niobium, tungsten, hafnium, and vanadium or alloys thereof. Titanium is especially preferred as a substrate for preparing anodes to be used in electrolysis of brine.

The precursor cobalt compounds used in making the present spinel structures may be any thermally-decomposable oxidizable compound which, when heated in the prescribed range, will form an oxide of cobalt. The compound may be organic, such as cobalt octoate or cobalt 2-ethyl hexanoate and the like, but is preferably an inorganic compound, such as cobalt nitrate, cobalt hydroxide, cobalt carbonate, and the like. Cobalt nitrate is especially preferred.

The precursor metal compounds of Groups IA, IB, IIA, and IIB and of the modifier metal oxides (if used) may be any thermally-decomposable oxidizable compound which, when heated in the prescribed range, will form oxides. Organic metal compounds may be used, but inorganic metal compounds are generally preferred.

Modifier oxides may be incorporated into the substituted $Co_3O_4$ coating to provide a tougher coating. The modifier oxide is selected from among the following listed groups:
Group III-B (Scandium, Yttrium)
Group IV-B (Titanium, Zirconium, Hafnium)
Group V-B (Vanadium, Niobium, Tantalum)
Group VI-B (Chromium, Molybdenum, Tungsten)
Group VII-B (Manganese, Technetium, Rhenium)
Lanthanides (Lanthanum through Lutetium)
Actinides (Actinium through Uranium)
Group III-A Metals (Aluminum, Gallium, Indium, Thallium)
Group IV-A Metals (Germanium, Tin, Lead)
Group V-A Metals (Antimony, Bismuth).

The modifier oxide is, preferably, an oxide of cerium, bismuth, lead, vanadium, zirconium, tantalum, niobium, molybdenum, chromium, tin, aluminum, antimony, titanium, or tungsten. Mixtures of modifier oxides may also be used.

Most preferably, the modifier oxide is selected from the group consisting of zirconium, vanadium, and lead, or mixtures of these, with zirconium being the most preferable of these.

The amount of modifier oxide metal or metals may be in the range of zero to about 50 mole %, most preferably about 5 to about 20 mole % of the total metal of the coating deposited on the electroconductive substrate. Percentages, as expressed, represent mole percent of metal, as metal, in the total metal content of the coating. The modifier oxide is conveniently prepared along with the substituted $Co_3O_4$ from thermally decomposable oxidizable metal compounds, which may be inorganic metal compounds or organic metal compounds.

The carrier for the precursor metal compounds is preferably water, a mixture of water/acetone, or a mixture of water and a water-miscible alcohol, e.g., methanol, ethanol, propanol, or isopropanol. The carrier is one which readily evaporates during spinel formation. The precursor metal compounds are preferably soluble in the carrier or at least in very finely divided form in the carrier. Solubilizing agents may be added to the mixture, such as ethers, aldehydes, ketones, tetrahydrofuran, dimethylsulfoxide, and the like. In some instances, adjustments to the pH of the mixture may be made to enhance the solubility of the metal compounds, but attention should be given to whether or not the pH adjuster (acid or base) will add any unwanted metal ions. Ammonia is generally the best alkalizer since it does not add metal ions.

The procedure for preparing the coatings comprises starting with a clean substrate with surface oxides and contaminants substantially removed, at least on the surface(s) to be coated. The mixture of metal oxide precursors in a liquid carrier is applied to the substrate, such as by dipping, spraying, brushing, painting, or spreading. The so-coated substrate is subjected to a temperature in the prescribed range for a period of time to thermally oxidize the metal compounds to oxides, thereby forming the spinels of the present invention, along with any modifier metal oxides or second-phase metal oxides which may be co-prepared but which are not part of the expanded cobalt oxide spinel crystal structure. Generally, the first such application (which usually gives a relatively thin layer) is done quickly to avoid excessive oxidation of the substrate itself. Then as additional applications are made (i.e., applications of the precursor liquid carrier containing the metal compounds, followed by thermal oxidation) the thickness of the coating builds up, become tighter and denser, and there is a substantially reduced risk of excessively oxidizing the substrate under the spinel coating. Each subsequent layer is found to combine quite readily to preceding layers and a contiguous spinel coating is formed which is adhered quite well to the substrate. It is preferred that at least 3 such layer-applications are employed, especially from about 6 to about 12 such layer-applications.

It is best to charge the initial mixture of metal compounds into the liquid carrier in such a way that the desired ratio of metals are present on a molar basis to satisfy the stoichiometry of the desired polymetal spinel, also referred to herein as expanded cobalt spinel or substituted cobalt spinel.

The following enumerated paragraphs are presented to offer a simplified explanation, based on belief and experience, of what transpires when one or more divalent metal ions replace a portion of the cobalt ions in a cobalt oxide spinel, but the invention is not meant to be limited by, or confined to, this simplified explantation. This explanation is intended to cover divalent metals of Groups IIA, IB, and IIB insofar as replacement of cobalt ions in a cobalt oxide spinel structure is concerned.

1. A "single-metal" cobalt oxide spinel, $Co_3O_4$, is understood as having, per molecule, one $Co^{++}$ ion and two $Co^{+++}$ ions to satisfy the valence requirements of four $O^{--}$ ions; thus the single metal cobalt spinel may be illustrated by the empirical formula $Co^{++}Co_2^{+++}O_4^{--}$ to show the stoichiometric valence balance of cobalt cations with oxygen anions.

2. When divalent metal ions are substituted into the cobalt oxide spinel structure, they tend to replace divalent cobalt ions. For example when $Mg^{++}$ is fully substituted into the $Co_3O_4$ spinel structure, it replaces $Co^{++}$ giving a spinel illustrated by the empirical formula $Mg^{++}Co_2^{+++}O_4^{--}$.

3. When two or more divalent metal ions are substituted into the cobalt oxide spinel structure, then the structure can be written, empirically, as $M_xZ_yCo_{3-(x+y)}O_4$ or as, e.g., $M_xM'_{x'}Z_yCo_{3-(x+x'+y)}O_4$.

5. If an excess of divalent metal ions are present in the mixture from which the substituted cobalt oxide structures are prepared, the excess metal values tend to form a separate metal oxide phase which is not a spinel structure but which is present with the spinel structure.

6. It will be understood by practitioners of these arts that there may be some degree of imperfect spinel crystals which, if they could be isolated and measured separately may not conform exactly to the empirical structures written in this disclosure, but the spinel products prepared according to this invention can be said to conform substantially to the empirical formulae shown.

7. If metal values are in the mixture (from which the spinel structures are formed) which do not effectively replace cobalt ions in the cobalt oxide spinel structure, these metals tend to form separate metal oxide phases which act as modifiers of the spinel structures. For instance, where the spinel structures are formed by building up a contiguous layer of the spinel on a substrate by repeated applications of spinel-forming ingredients, each application being followed by the heating step, the modifier metal oxides are beneficial in providing toughness and abrasion-resistance to the layer. The mount of modifier metal oxides should be limited so that the desired spinel is the predominant ingredient of the coating.

The metals of the relevant groups of the Periodic Table are as follows:

| IIA | IB | IIB |
|-----|-----|-----|
| Be  | Cu  | Zn  |
| Mg  | Ag  | Cd  |
| Ca  | Au  | Hg  |
| Sr  |     |     |
| Ba  |     |     |
| Ra  |     |     |

Operative upper limits for molar percentage of the M and Z metals which form trimetal spinels with cobalt are, based on total metal content of the spinel: $M<33.3\%$ but not zero, $Z<33.3\%$ but not zero, and $M+Z \leq 33.3\%$. Any excess of M and Z will form a separate phase of the metal oxide amongst the spinel crystals. On a molar metal basis it preferred that neither M nor Z be less than about 8%.

The following examples are to illustrate the invention, but the invention is not limited to the particular embodiments shown.

EXPERIMENTAL

The type of test cell utilized in Example I was a conventional vertical diaphragm chlorine cell. The diaphragm was deposited from an asbestos slurry onto a foraminous steel cathode in the conventional manner. Anode and cathode were each approximately 3"×3" (7.62 cm×7.62 cm). Current was brought to the electrodes by a brass rod brazed to the cathode and a titanium rod welded to the anode. The distance from the anode to the diaphragm face was approximately ¼ inch (0.635 cm). Temperature of the cell was controlled by means of a thermocouple and heater placed in the anolyte compartment. A 300 gpl sodium chloride solution was fed continuously to the anolyte compartment via a constant overflow system. Chlorine, hydrogen, and sodium hydroxide were withdrawn continuously from the cell. Anolyte and catholyte levels were adjusted to maintain an NaOH concentration in the catholyte of about 110 gpl. Power was supplied to the cell by a current-regulated power supply. Electrolysis was conducted at an apparent current density of 0.5 ampere per square inch (6.45 cm$^2$) anode area.

The etching solution employed in the examples below was prepared by mixing 25 ml analytical reagent hydrofluoric acid (48% HF by weight), 175 ml analytical reagent nitric acid (approximately 70% HNO$_3$ by weight), and 300 ml deionized H$_2$O.

Anode potentials were measured in a laboratory cell specifically designed to facilitate measurements on 3"×3" (7.62×7.62 cm) anodes. The cell is constructed of plastic. Anode and cathode compartments are separated by a commercial PTFE membrane. The anode compartment contains a heater, a thermocouple, a thermometer, a stirrer, and a Luggin capillary probe which is connected to a saturated calomel reference electrode located outside the cell. The cell is covered to minimize evaporative losses. Electrolyte is 300 gpl sodium chloride brine solution. Potentials are measured with respect to saturated calomel at ambient temperature (25°–30° C.). Lower potentials imply a lower power requirement per unit of chlorine produced, and thus more economical operation.

EXAMPLE I

Nine pieces of ASTM Grade 1 titanium expanded mesh approximately 3"×3"×0.050" (7.62×7.62×0.13 cm) were dipped in 1,1,1-trichloroethane, air dried, dipped in HF-HNO$_3$ etching solution approximately 30 seconds, rinsed with deionized water, and air dried. The mesh was blasted with Al$_2$O$_3$ grit to a uniform rough surface and blown clean with air. Six coating solutions were prepared by mixing appropriate quantities of Co(NO$_3$)$_2$·6H$_2$O, Zn(NO$_3$)$_2$·6H$_2$O, Mg(NO$_3$)$_2$·6H$_2$O, Cu(NO$_3$)$_2$·6H$_2$O and aqueous ZrO(NO$_3$)$_2$ with deionized H$_2$O to give the mole ratios listed in Table I below. Three sheets (set 1 below) were brushed with the appropriate coating solution, baked in a 375° C. convection oven for about 10 minutes, removed, and cooled in air about ten minutes. Ten additional coats were applied in a similar manner. A twelfth coat was applied and baked 60 minutes at 375° C. Three sheets (set 2) were coated in a similar manner to Set 1 except that the first 11 coats were baked at 475° C. in a convection oven. Three sheets (set 3) were coated similarly to set 1 except that the twelfth coat was applied and baked ten hours at 325° C.

The anodes were installed in test cells as described above and operated continuously for extended periods of time. Their operating potentials were measured in the special cell described above.

In each comparable set of anodes, those coatings containing two metals of Groups IB, IIA, and/or IIB (i.e., ternary spinel coatings) had lower operating potentials, and thus a lower operating cost, than the coating containing one such metal (i.e., binary spinel coating). The zirconium compound gave ZrO$_2$ as a separate phase dispersed in the spinels which serves as a modifier oxide. The data are in Table I below.

TABLE I

| SET/ SAMPLE | Mole Ratio of Metals in Coating** | | | | | Value of x(1) | Value of y(1) | Anode(2) Potential |
|---|---|---|---|---|---|---|---|---|
| | Co | Zn | Cu | Mg | Zr | | | |
| 1a* | 2 | 1 | 0 | 0 | 0 | 1 | 0 | 1088 |
| b | 8 | 3 | 1 | 0 | 0 | 0.75 | 0.25 | 1077 |
| c | 8 | 3 | 0 | 1 | 0 | 0.75 | 0.25 | 1078 |
| 2a* | 2 | 1 | 0 | 0 | 0 | 1 | 0 | 1158 |
| b | 8 | 3 | 1 | 0 | 0 | 0.75 | 0.25 | 1124 |
| c | 8 | 3 | 0 | 1 | 0 | 0.75 | 0.25 | 1108 |
| 3a* | 10 | 5 | 0 | 0 | 1 | 1 | 0 | 1091 |
| b | 40 | 15 | 5 | 0 | 4 | 0.75 | 0.25 | 1079 |
| c | 40 | 15 | 0 | 5 | 4 | 0.75 | 0.25 | 1077 |

*Comparative example.
(1)Approximate values of x and y in the formula M$_x$Z$_y$Co$_{3-(x+y)}$O$_4$.
(2)Anode potential is measured in millivolts at 0.5 Asi, 70° C. vs. SCE at 30° C.
**Zr present in the spinel coating as modifier oxide, ZrO$_2$.

EXAMPLE II

To further distinguish the present coatings from the art, various coatings were applied to pyrex glass substrates. A non-electrically conducting substrate was chosen to facilitate measurements of the conductivity of the coating itself. Six pieces of pyrex glass 1"×3"×0.125" (2.54×7.62×0.318 cm) were dipped in deionized water, air dried, dipped in ethanol and air dried. One of the 1"×3" sides of each piece of pyrex glass was blasted with Al$_2$O$_3$ grit to a uniform rough surface and blown clean with air. Three coating solutions were prepared by mixing appropriate quantities of Co(NO$_3$)$_2$·6H$_2$O, Zn(NO$_3$)$_2$·6H$_2$O, Mg(NO$_3$)$_2$·6H$_2$O, and deionized H$_2$O to give the mole ratios listed in Table II below. The grit blasted sides of the pyrex were brushed with the appropriate coating solution, baked in a 375° C. convection oven for about ten minutes, removed, and cooled in air about ten minutes. Ten additional coats were applied in a similar manner. A twelfth coat was applied and baked 60 minutes at 375° C. Conductivity of these coatings was measured by the four-probe bridge method. The data are shown in Table II.

In this example, M of the general formula is Zn, Z is Mg, and y=1−x. Conductivity of the three-metal coatings of the present invention exceeds that of the two-metal coatings of the prior art, implying lower operating voltages and more economical operation when the coatings are applied to electroconductive substrates.

TABLE II

| SAMPLE | MOLE RATIO OF METALS IN COATING | | | VALUE OF x(1) | CONDUCTIVITY (MHO/CM) |
|---|---|---|---|---|---|
| | CO | Zn | Mg | | |
| 1* | 2 | 1 | 0 | 1.000 | 1.38 |
| 2 | 16 | 7 | 1 | 0.875 | 2.61 |
| 3 | 8 | 3 | 1 | 0.750 | 2.90 |
| 4 | 6 | 2 | 1 | 0.667 | 3.43 |
| 5 | 4 | 1 | 1 | 0.500 | 2.57 |
| 6* | 2 | 0 | 1 | 0.000 | 1.51 |

*Comparative examples
(1)Approximate value in the Formula Zn$_x$Mg$_{1-x}$Co$_2$O$_4$.

EXAMPLE III

Other spinel coatings prepared substantially in accordance with procedures described above are, e.g.:
Cu$_{0.25}$Zn$_{0.75}$Co$_2$O$_4$
Cd$_{0.25}$Zn$_{0.75}$Co$_2$O$_4$
Cu$_{0.5}$Zn$_{0.5}$Co$_2$O$_4$ $Cd_{0.5}Zn_{0.5}Co_2O_4$ These spinels are also found to be effective as anode material in a chlor-alkali cell.

We claim:

1. An electrically-conductive composite comprising an electrically-conductive substrate having, on at least a portion thereof, a conductive spinel coating, said coating comprising a metal cation substituted cobalt oxide spinel structure conforming substantially to the empirical formula $M_xZ_yCo_{3-(x+y)}O_4$, where M represents at least one metal of the Groups consisting of IB, IIA, and IIB of the Periodic Table, where Z represents at least one other metal of the Groups consisting of IB, IIA, and IIB of the periodic table, where x is an integer greater than zero, but less than 1, where y is an integer greater than zero, but less than 1, where the sum of x and y is greater than zero, but not greater than 1, and where the amounts of M, Z, and Co are sufficient to substantially satisfy the valence requirements of oxygen in the spinel structure.

2. The composite of claim 1 wherein the composite is an electrode.

3. The composite of claim 1 wherein the composite is an anode.

4. The composite of claim 1 wherein the composite is an anode in a brine electrolysis cell.

5. The composite of claim 1 wherein the substrate is a valve metal or film-forming metal selected from the groups consisting of Ti, Ta, Zr, Mo, Nb, W, Hf, and V.

6. The composite of claim 1 wherein the substrate is Ti.

7. The composite of claim 1 wherein M is Zn and Z is at least one of Cu and Mg.

8. The composite of claim 1 wherein the spinel coating contains a modifier metal oxide.

9. The composite of claim 1 wherein the modifier metal oxide is $ZrO_2$.

10. The composite of claim 1 wherein the composite is an anode material in an electrolytic cell.

* * * * *

UNITED STATES PATENT AND TRADEMARK OFFICE
CERTIFICATE OF CORRECTION

PATENT NO. : 4,368,110

DATED : January 11, 1983

INVENTOR(S) : Donald L. Caldwell and Mark J. Hazelrigg

It is certified that error appears in the above—identified patent and that said Letters Patent is hereby corrected as shown below:

Col. 1, line 22; "wheere" should read --where--.

Col. 3, line 52; "explantation" should read --explanation--.

Col. 4, line 8; the figure "5" should be --4--.

Col. 4, line 14; the figure "6" should be --5--.

Col. 4, line 22; the figure "7" should be --6--.

Col. 4, line 33; "mount" should read --amount--.

Col. 7, line 21, Claim 1; "an integer" should read --a numerical value--.

Col. 7, line 23, Claim 1; "an integer" should read -a numerical value--.

Signed and Sealed this

Ninth Day of August 1983

[SEAL]

Attest:

GERALD J. MOSSINGHOFF

Attesting Officer

Commissioner of Patents and Trademarks